US009242596B2

(12) United States Patent
Thomson

(10) Patent No.: US 9,242,596 B2
(45) Date of Patent: Jan. 26, 2016

(54) ADJUSTABLE DOWNLIGHTER

(71) Applicant: James Waugh Thomson, Rugby Warwickshire (GB)

(72) Inventor: James Waugh Thomson, Rugby Warwickshire (GB)

( * ) Notice: Subject to any disclaimer, the term of this patent is extended or adjusted under 35 U.S.C. 154(b) by 0 days.

(21) Appl. No.: 14/353,294

(22) PCT Filed: Oct. 19, 2012

(86) PCT No.: PCT/GB2012/052605
§ 371 (c)(1),
(2) Date: Apr. 22, 2014

(87) PCT Pub. No.: WO2013/061036
PCT Pub. Date: May 2, 2013

(65) Prior Publication Data
US 2014/0313756 A1    Oct. 23, 2014

(30) Foreign Application Priority Data

Oct. 23, 2011 (GB) .................................... 1118248.2
Jan. 12, 2012 (GB) .................................... 1200433.9

(51) Int. Cl.
  *B60Q 1/32* (2006.01)
  *B60Q 1/24* (2006.01)
  *B60Q 1/48* (2006.01)

(52) U.S. Cl.
  CPC .. *B60Q 1/32* (2013.01); *B60Q 1/24* (2013.01); *B60Q 1/484* (2013.01)

(58) Field of Classification Search
  USPC .......................... 362/485, 487, 501, 505, 506
  See application file for complete search history.

(56) References Cited

U.S. PATENT DOCUMENTS

| 1,802,958 | A | | 4/1931 | Ravencroft |
| 1,810,216 | A | | 6/1931 | Kurtz |
| 2,193,063 | A | | 3/1940 | Dettweiler |
| 3,457,397 | A | | 7/1969 | Tindall |
| 5,209,559 | A | | 5/1993 | Ruppel |
| 5,430,625 | A | * | 7/1995 | Abarr et al. ................... 362/485 |
| 6,543,917 | B1 | * | 4/2003 | Berlinghof ................... 362/485 |
| 7,175,320 | B1 | | 2/2007 | Burgess |
| 2003/0107900 | A1 | * | 6/2003 | Ellison .......................... 362/485 |
| 2003/0174505 | A1 | * | 9/2003 | Wainwright ................. 362/485 |
| 2005/0068785 | A1 | * | 3/2005 | Takeda et al. ................. 362/506 |
| 2012/0268960 | A1 | * | 10/2012 | Kiser ............................ 362/485 |

FOREIGN PATENT DOCUMENTS

| DE | 10058903 | 4/2002 |
| DE | 20312419 | 10/2003 |
| DE | 102005029017 | 9/2006 |

(Continued)

OTHER PUBLICATIONS

International Search Report dated Feb. 12, 2013, corresponding to PCT/GB2012/052605.

(Continued)

*Primary Examiner* — Laura Tso
(74) *Attorney, Agent, or Firm* — Young & Thompson

(57) ABSTRACT

A vehicle or trailer side marker and/or downlight (10) includes a casing or housing (1) and adjustable mounting (4,5), an internal reflector an internal baffle or shield, a light source, a lens or diffuser cover to allow adjustment of beam orientation, direction or angular spread to determine ground spread and beam upper margin limits so as not to dazzle others.

10 Claims, 9 Drawing Sheets

(56) References Cited

FOREIGN PATENT DOCUMENTS

| | | |
|---|---|---|
| DE | 102005050642 | 4/2007 |
| GB | 453 694 | 9/1936 |
| JP | 10211846 | 8/1998 |
| WO | 03/027990 | 4/2003 |
| WO | 2005/123451 | 12/2005 |
| WO | 2010151209 | 12/2010 |

OTHER PUBLICATIONS

British Search Report dated Mar. 7, 2012, corresponding to the priority application No. GB1200433.9.

* cited by examiner

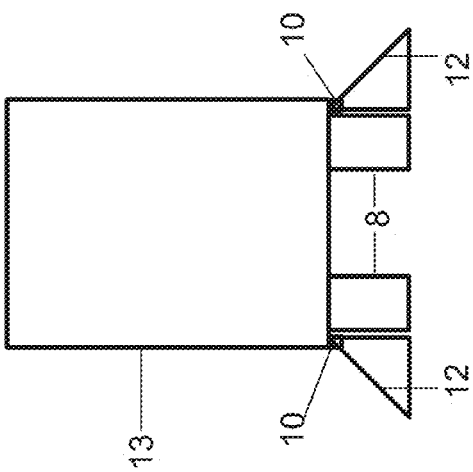
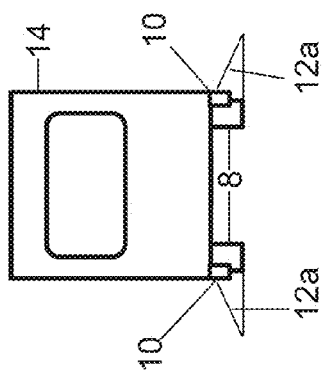
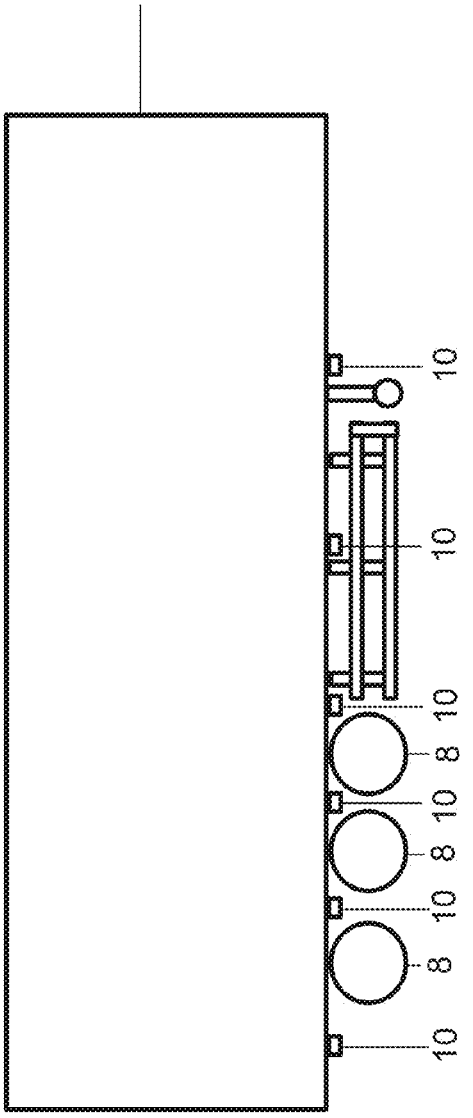

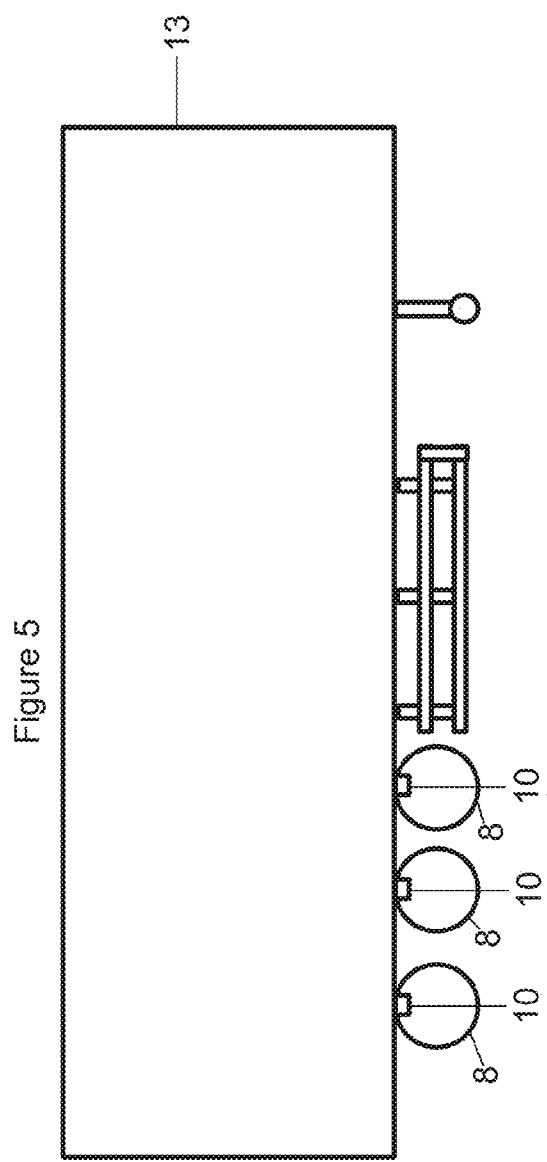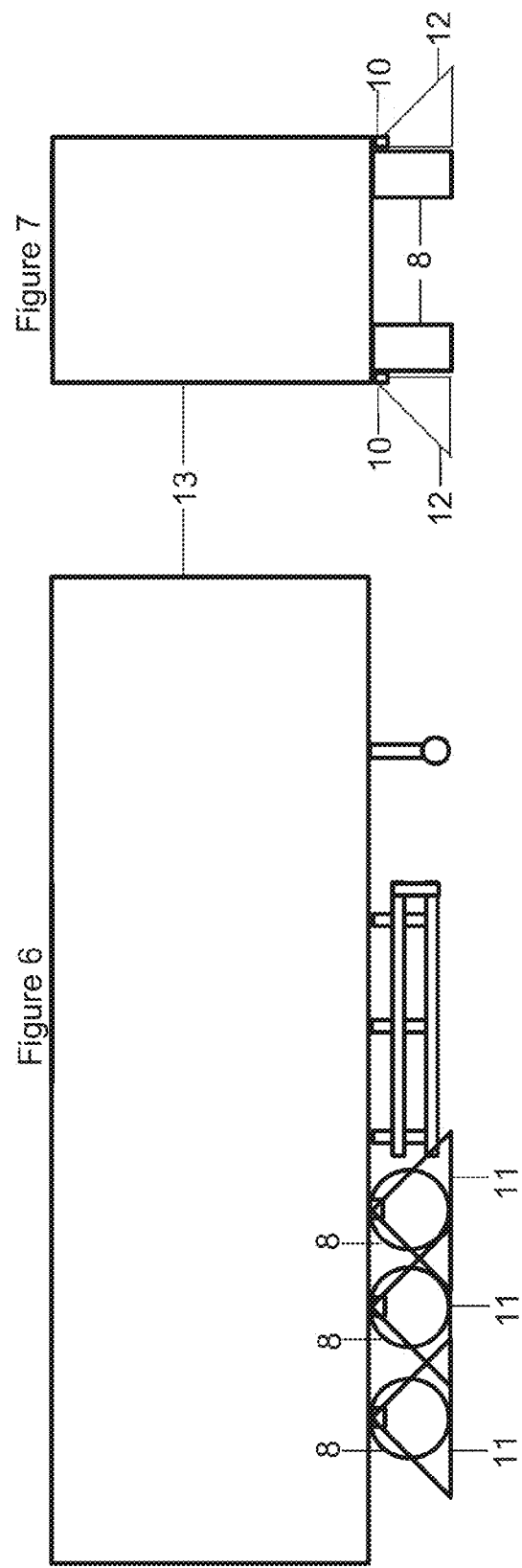

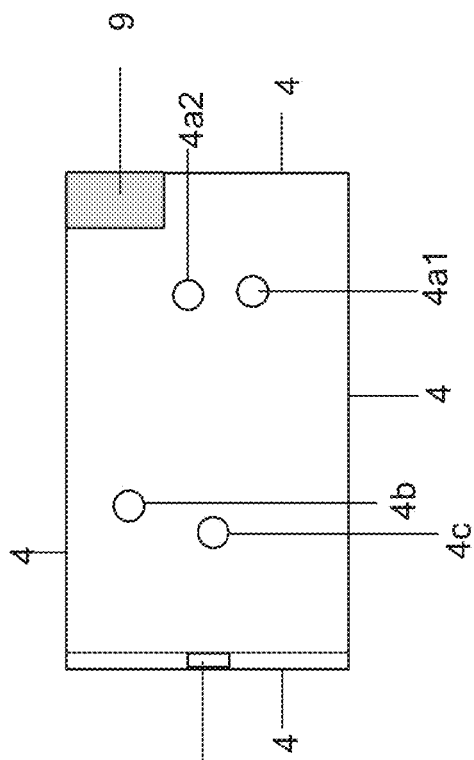
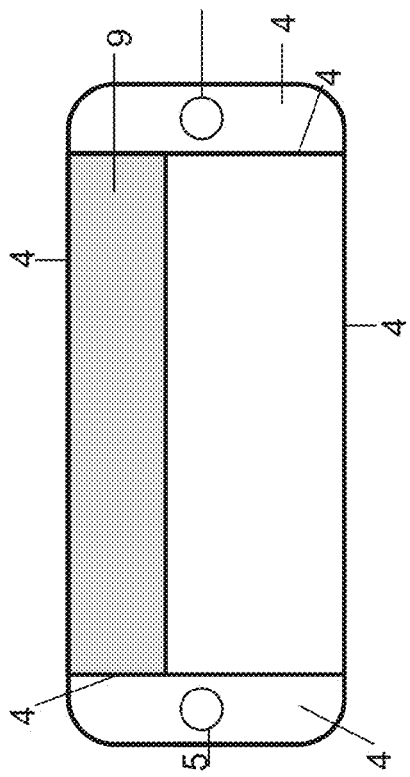
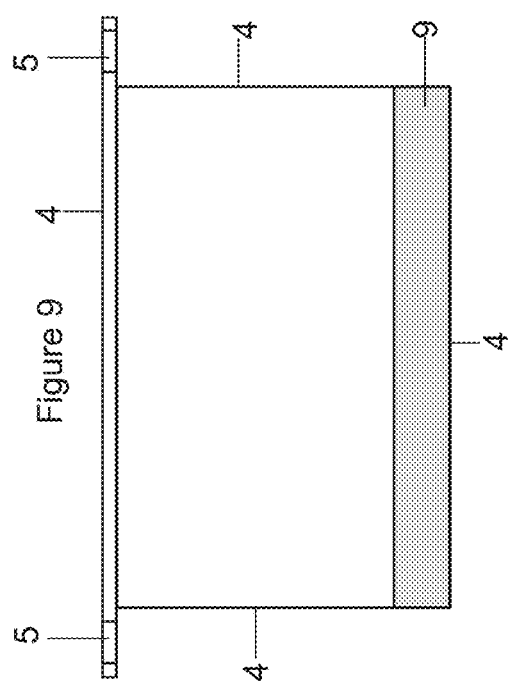

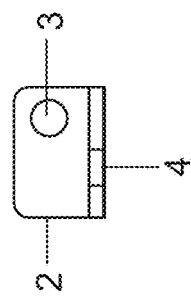
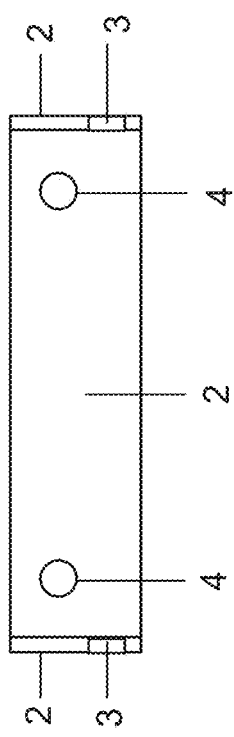
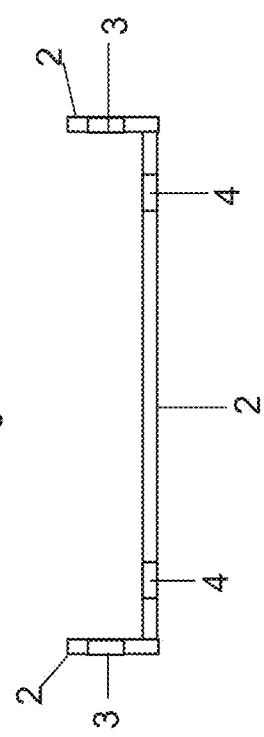

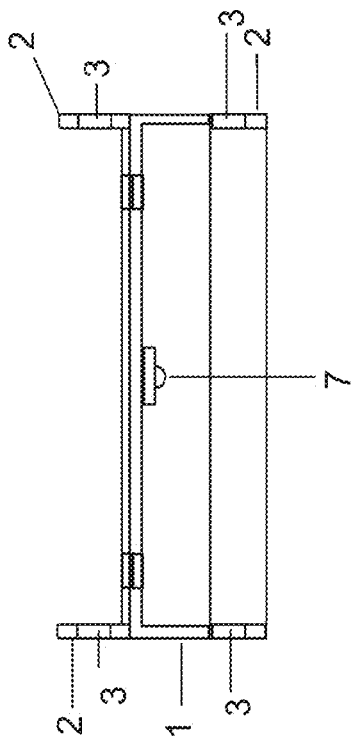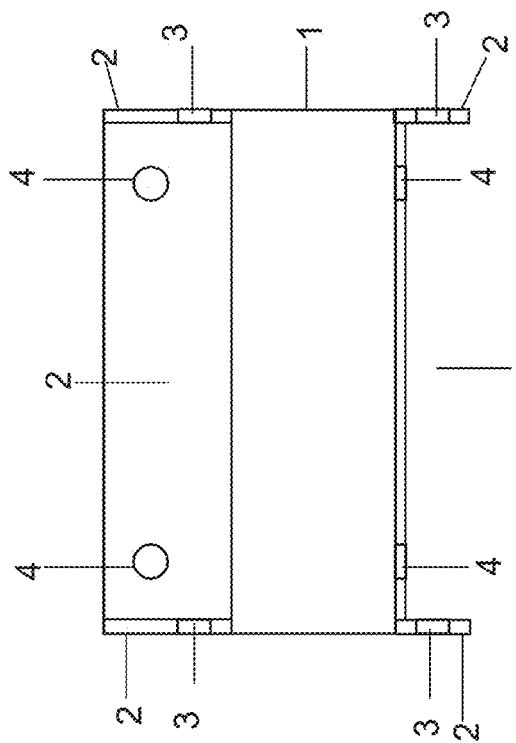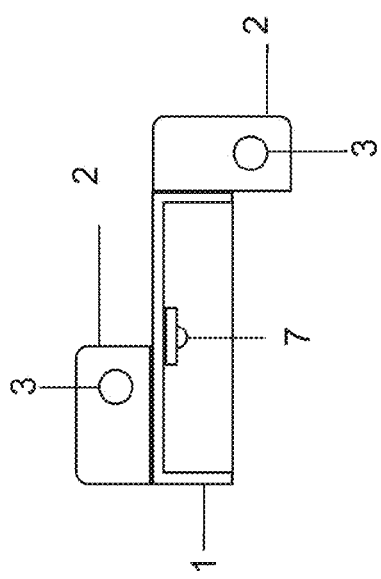

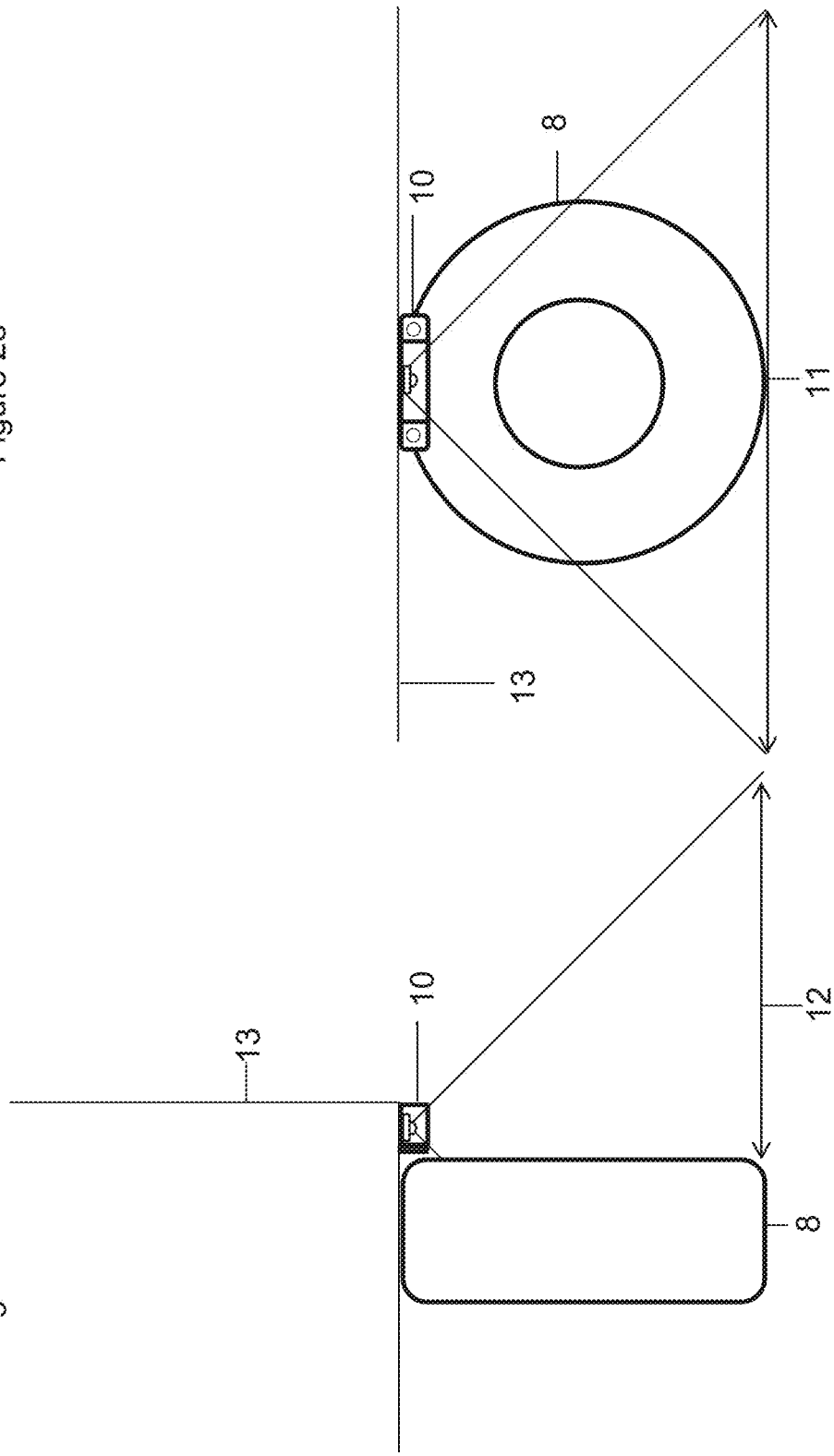

ADJUSTABLE DOWNLIGHTER

This invention relates to vehicle lighting and is particularly but not exclusively concerned with visual marking and delineation of a freight or goods road vehicle or trailer, for the benefit of a vehicle driver and drivers of other vehicles, pedestrians or remote bystanders. Driver needs are not the same as those of others and so may not be best served by the same light format. Marking to a vehicle sides is one consideration. For convenience the term vehicle is used herein to embrace a self-propelled truck or towed or towable trailer, or indeed any other movable body to which a downlight may be fitted.

BACKGROUND TO THE INVENTION

When driving a motor vehicle and/or trailer combination it can be a problem for the driver to see along the side perimeter and the safe clearance area surrounding the sides of the vehicle. Front mounted headlights give illumination to the front and in some respects a wider forward field of vision beyond that of the vehicle width, at least when looking and driving forward. Rear mounted reversing lights are of little or no use to the driver in judging width, since the area immediately behind the vehicle is not visible.

Current side marker lights are again of little or no use to the driver, since they illuminate horizontally outward, rather than downward. They only give notice to other road users of some sort of vehicle presence when looking at the side of the vehicle and/or trailer.

When visibility is hampered, such as by thick fog or lashing rain, the current side marker lights are often not visible when being overtaken. Other road users have been known to go underneath an articulated trailer when in thick fog, due to the insufficient light being displayed along the side of the vehicle.

For a driver of a long vehicle is in a dark situation it is problematic to see the exact location of that vehicle or indeed anything else around it. Reference to this problem was highlighted in the 1992 heavy goods video 'Driving Skills For Life' Section 9D, which became the UK's Official Goods Vehicle Driving Video and was made by Creative Training. It is now 2012 and still nothing has been successfully produced to overcome this problem. Once a driver of an articulated vehicle is faced with the aforementioned dilemma, where a road might be narrow and there is no lighting, there is no way of knowing whether or not any damage is being committed by or to the side of the trailer, until the manoeuvre has taken place and the vehicle and surrounding area has been checked.

PRIOR ART

Fixed side marker lights and reflectors are common for freight vehicles and trailers and in some jurisdictions are required by statute. The prime intention of these is to provide a visual indication of the presence of vehicle when viewed from afar by other road users. Daylight running lights or provision within night lighting are also known, but generally to the front.

U.S. Pat. No. 5,209,559 Ruppel teaches a fixed down light or illumination to the rear. These are limited and inflexible in installation and use, and risk shining distracting and disturbing light sideways, which poses a hazard and breach of regulations. A non-dazzling downlight adaptable to different vehicles and installation constraints is desirable, but poses a challenge addressed by some aspects of the present invention.

STATEMENT(S) OF INVENTION

Aspects of the invention provide
A downlight configurable for vehicle or trailer mounting
with an adjustable light beam output orientation, direction and spread,
through adjustable support, internal reflector or external lens or diffuser,
to accommodate diversity in installation height
with longitudinal and lateral beam spread
and ground illumination footprint.

A vehicle or trailer side marker and/or downlight
comprising a casing or housing
a light source
one or more internal reflectors
one or more internal baffles or shields
a lens or diffuser cover
adjustable mounting for beam orientation, direction or angular spread
such as in a vertical plane.

A down light for a vehicle or trailer
with a housing and adjustable mounting
so that the angle of incidence between a light beam and a ground plane
may be adjusted to accommodate different mounting heights,
with beam angular spread and beam margin height limit
adjustable or containable by internal reflectors, baffles or lens covers or diffusers,
to inhibit risk of dazzle hazard to other road users.

Such downlighting provides illumination to an area around the side of a vehicle and/or trailer, so that a driver can see what is going on around them, including the presence of pedestrians or cyclists along the perimeter and adjacent to the sides. Increased visible presence of the vehicle is also offered to other road users from the side. This is imperative, especially when maneuvering/driving in poor visibility conditions.

In a particular construction, a light is fixed rigidly to the body/chassis of a vehicle/trailer and the light source, which may be, inter alia, an LED or luminescent bulb and its associated light carrier may be pivoted/rotated about a vertical axis in order to alter the angle of incidence between the light source and the plane of the road surface.

Thus a light and housing may be fitted at a certain vertical distance from the road surface, say, by a non-rotational housing, and then the illuminating means and carrier is pivoted/rotated to the desired angle for the avoidance of dazzling and so offering an illuminated area adjacent to the side of the vehicle/trailer.

When fitted to a vehicle a down light must not shine directly in the eyes of other road users. So its height of fitment and angle of light is important. The higher up the more light is spread on the ground. The lower it is fitted, the less the highlighted area unless the angle of light is changed.

With the advancement in technology over the past few years with light-emitting diode (LED) and the various ranges of output power including high-power LEDs (HPLED), this form of lighting technology will help greatly to keep the physical size of this invention down to a minimum and so reduce in weight.

To assist with giving an even light coverage and preventing direct eye contact with the apparent surface of the down light source, the illuminating light carrier can be adjusted in to various different angles, offering a selection of vertical downward light spreads over various heights of fitment. This method of light adjustment ensures that the device does not alter in physical size, which could affect the overall vehicle dimensions if fitted at the edge of the vehicle/trailer (Construction and Use Regulations in all Territories). Once fitted and the required angle has been set, the device does not require any further adjustment. The side marker light is contained within a separate compartment to that of the adjustable down light.

The Vehicle Lighting Regulations across all Territories of the globe states that two white lights must be seen from the front, two red lights must be seen from the rear and that a required amount of amber lights (depending upon the relevant regulations and vehicle design) must be seen from the side. For this reason alone an additional object of this invention is that the device will only adjust in the vertical axis giving an outward/inward light coverage since any amber lights must be perpendicular to the side of the vehicle/trailer. Therefore the light beam cannot be rotated up to the horizontal plane to shine to the front or the rear for example, since this could conflict with the lighting regulations.

For existing vehicle fleets, it is convenient, for consistency and harmony of visual alignment, to fit a discrete downlight, for positioning (just) below an existing side marker light. This can be connected into a common or shared wiring harness or loom, given sufficient current carrying capacity, with adjustment of lighting circuit fuse capacity accordingly. Vehicle battery and engine driven generator power would face additional load which can be compensated for by design or retrofit.

For a new vehicle build or OEM installation, a combined fixed orientation side marker light and adjustable orientation downlight can be adopted, again sharing a wiring loom. This could usefully have a compact format, even with (internal) beam adjustment provision. A split casing, with sub-divided side marker and downlighter portions, could allow mutual angular adjustment.

A coloured lens may be fitted to the downlight to complement that of the side marker light, which in the UK is amber by legislation. That said, in principle, subject to prevailing regulatory constraints, other single or multi-colour down lighting might be contemplated where local legislation allows. Thus, say, a banded or continuum gradient colour and/or gradient single colour or monochrome light intensity band downlight might be adopted to indicate distance from a vehicle footprint.

Directly downward, with an outward cut-off or limiter to avoid distraction, but possibly with a modest inward light spread or spill under a vehicle, could be designated by say a brighter amber and/or red as a warning against inadvertent side collision and entry in otherwise poor visibility. This could assist driver manoeuvre by clearly visible more prominent ground delineation of vehicle position.

A downlight can usefully delineate by reflection from the ground. Local general ground area illumination immediately adjacent a vehicle margins by a downlight is key. Light patterns could also be contemplated better to convey spatial reference. Thus, say, a matrix or grid pattern of lines or dots could assist this.

A reflector, such as with adjustable panels, could play a role in beam spread determination. A front lens or diffuser, such as a Fresnel lens with serration or ridge patterns, could contribute to this and to anti-glare measures.

A side-mounted downlight also has advantages for other road users in making the vehicle more visually prominent to others. In that regard a downlight usefully supplements a side marker light or reflector.

A 'passive' side reflector could be combined with some self-illumination to serve a side marker role, without producing disturbing glare to others. Thus unwanted stray light could be contained or suppressed, say by internal reflection or re-direction. The marker would then 'glow' without shining unduly outward.

If a significant change in vehicle body or chassis ride height occurs with different loading, and which might otherwise affect downlight height and so sideways direction and downward ground spread, a further beam adjustment might be contemplated. Thus an upper beam spread margin set for a loaded vehicle, may be to high when the vehicle is unloaded. Adjustment might use spirit-level, gravity see-saw pendulum, or gyroscopic horizontal reference as a threshold to limit or depress upper beam margin spread. An automated dynamic beam adjustment, such as a self-balanced mount, could be contemplated.

To facilitate adoption of the downlight as a new additional lighting measure, an installation rig could be contrived, by which all lights on the same side could be set to the same downlight beam spread margins and orientation for consistency and harmony in visual stance and disposition.

By trial and experiment for a particular vehicle individual down light spread and orientation could be set differently from one another for a particular combined overall effect, such as a shaped periphery ground spread. Ground illumination profile could be adapted to suit driver perceptions, for a better appreciation of vehicle presence and footprint from a rearward glance, again to help with vehicle maneuvers.

Beam spread and orientation could be achieved with a multi-faceted reflector panels, some adjustable. Similarly, with a multi-panel front and peripheral lens portions, alone or in co-operation with the reflectors.

Independent adjustability in beam orientation, direction and spread is desirable for each beam. One measure is an adjustable lamp casing mounting. Another measure is adjustable internal reflectors. A further measure is an adjustable internal lamp mounting.

Some aspects of the invention provide
a multiple role, multiple beam, combination lamp or light comprising a first light beam portion,
with an internal reflector, baffle and external lens configured to direct light output substantially sideways
with a wide horizontal spread angle
but a limited vertical spread angle
to provide a visual side marker for external observation;
a second light beam portion with an internal reflector and external lens configured as a downlight
to direct light output substantially downward
with a limited sideways spread angle, say of up to 90 degrees;

A common or shared light source could be used for both light beam portions, such as with filters to adjust intensity and/or colour. A multi-element bulb could be used selectively to provide different light outputs per element. A similar effect may be achieved with apportioned LED clusters in different groupings and sub-groups. Alternatively, discrete pin-point light sources with appropriate output and colour could be employed.

Independent beam setting, such as of orientation, direction and spread, may be achieved for different beams upon a shared mounting and/or within a common housing.

Although a side light and down light combination has special utility, other multiple lamp, reflector and lens combinations may be contrived for specialised functional and/or decorative purposes.

A side and downlight be used as so-called daylight running lights, with appropriate adjustment in light output to be visibility in daylight.

EMBODIMENTS

Some particular embodiments a down light of the invention will now be described by way of example only with reference to accompanying diagrammatic and schematic drawings in which:

FIG. 1 shows the fitment of a downlight 10 along the side edge but within the confines of a semi-trailer 13.

FIG. 2 shows the horizontal light spread 11 from the downlight 10 when fitted high up on the chassis of a semi-trailer (13).

FIG. 3 shows from the rear, the vertical angle of the light spread 12 from the downlight 10, covering the area adjacent to the sides, when fitted high up on the chassis of a semi-trailer (13) but within the confines of the vehicle/trailer.

Figure 13:
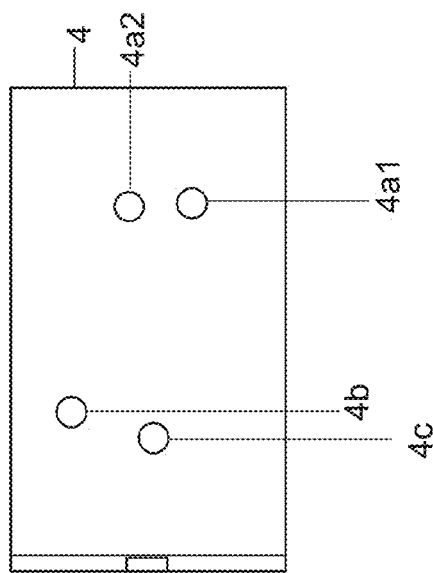

FIG. 4 shows from the rear, the shallower vertical angle of the light outward spread 12a from the downlight 10 by tilting the light assembly 20 to a different greater angle, offering a shallower angle of light spread 12a, when fitted lower to the ground on a caravan 14 but within the confines of the caravan.

FIG. 5 shows the fitment of the downlight 10 above the wheels 8 but within the confines of a semi-trailer 13.

FIG. 6 shows the horizontal light spread 11 from the downlight 10 when fitted above the wheels 8, but within the confines of a semi-trailer 13.

FIG. 7 shows from the rear, the vertical angle light spread 12 from the downlight 10 when fitted above the wheels 8, but within the confines of a semi-trailer 13.

FIG. 8 shows a front elevation of the downlight 10, highlighting the location of a separate side marker light compartment 9 and the location of the angular pivot holes; including the locations of holes (4a1) for a pivot pin (not shown), allowing a location pin to be inserted into 4b or 4c to locate two different angles, with a third angle being introduced by a location pin 4c remaining in position (4c) while the pivoting pin (4a1) is relocated into position 4a2.

FIG. 9 shows a plan view of the downlight 10 of FIG. 8 with pivot holes 4a1, 4a2, 4b, 4c highlighting the location of the separate marker light compartment (9).

FIG. 10 shows a right end elevation of the downlight 10 highlighting the location of the separate side marker light compartment 9.

Figure 11:
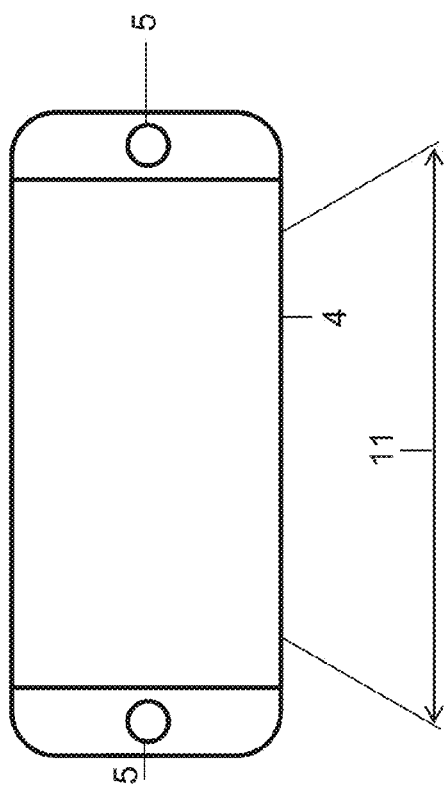

FIG. 11 shows a front elevation of the downlight 10 without a side marker light compartment.

Figure 12:
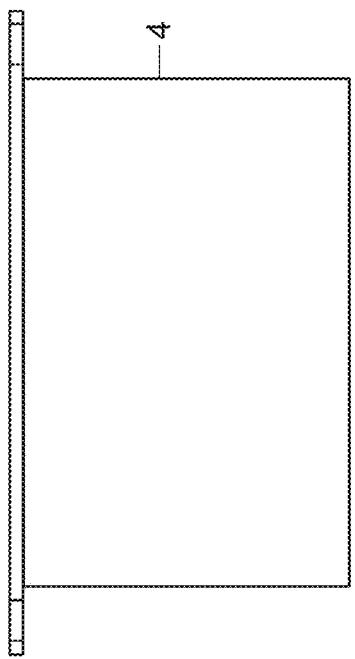

FIG. 12 shows a plan view of the downlight 10 without a side marker light compartment.

FIG. 13 shows a right end elevation of a downlight 10 without the side marker light compartment, and the location of mounting and adjustment holes 4a1, 4a4, 4b, 4c for angular pivoting.
to include the locations holes (4a1) which is for the pivoting pin, allowing the location pin to be inserted into (4b) or (4c) to locate two different angles, with a third angle being introduced by the location pin (4c) remaining in position (4c) while the pivoting pin (4a1) is relocated into position (4a2).

Figure 14:
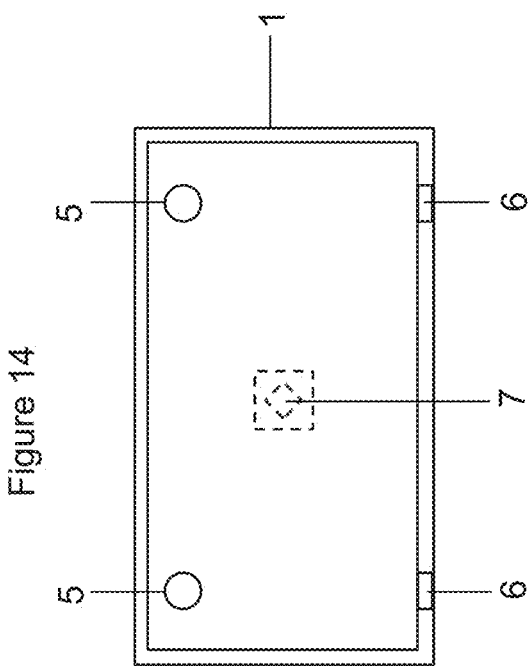

FIG. 14 shows a plan view of an LED gear tray 1 for a downlight 10 with the position of an LED chip (7) and the holes 5 for securing the top bracket (2) which holds the pivoting/location pin and the holes (6) for the securing of the front bracket (2) which holds the pivoting/location pin.

Figure 15:
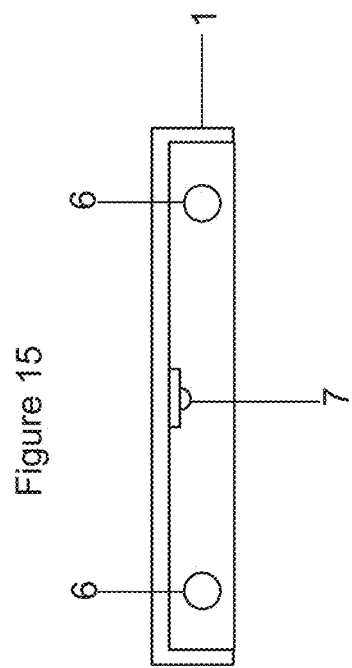

FIG. 15 shows a front view of an LED gear tray 1 of FIG. 14.

Figure 16:
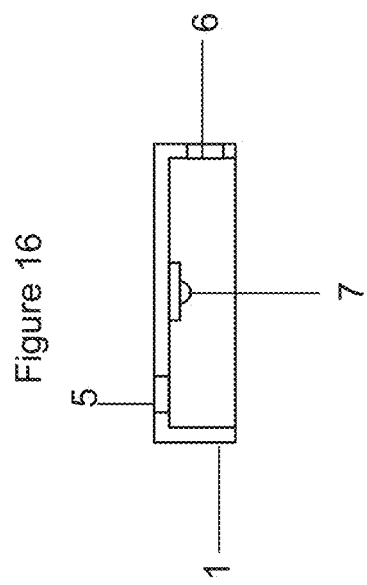

FIG. 16 shows a right end elevation of a LED gear tray 1 of FIGS. 14 and 15.

FIG. 17 shows a plan view of a mounting and securing bracket 2 and the holes (4) to fix the bracket (2) to the top of the LED gear tray (1) with the pivoting/location pin holes (3)

FIG. 18 shows a front view of the mounting and securing bracket of FIG. 17.

FIG. 19 shows a right end elevation of the mounting and securing bracket of FIG. 17 and the location of the hole 3 for a pivot and/or location pin.

FIG. 20 shows a right end elevation of an angularly adjustable light assembly, which is made up of the LED gear tray (1) 2 off securing brackets (2) and the LED chip (7).

FIG. 21 shows a front elevation of the angularly adjustable light assembly of FIG. 20.

FIG. 22 shows a top view of the angularly adjustable light assembly of FIG. 20.

Figure 23:
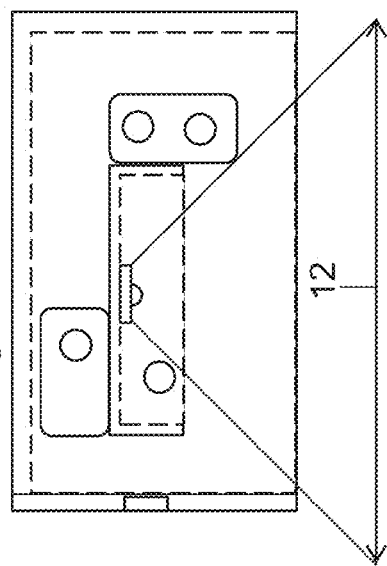

FIG. 23 shows a combination of FIGS. 13 and 20 using pivot hole 4a1 and location hole 4b, with a vertical angular light spread 12 of 45°.

Figure 24:
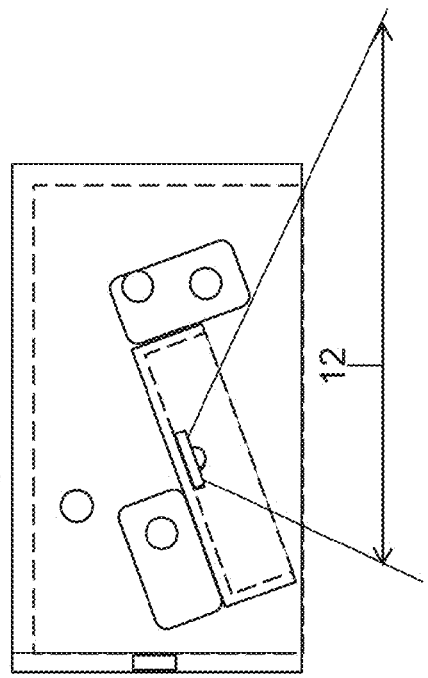

FIG. 24 shows a combination of FIGS. 13 and 20 angled to give off a shallower vertical light spread, by using pivot hole 4a1 and location hole 4c, for a vertical angular light spread 12 of 25°.

Figure 25:
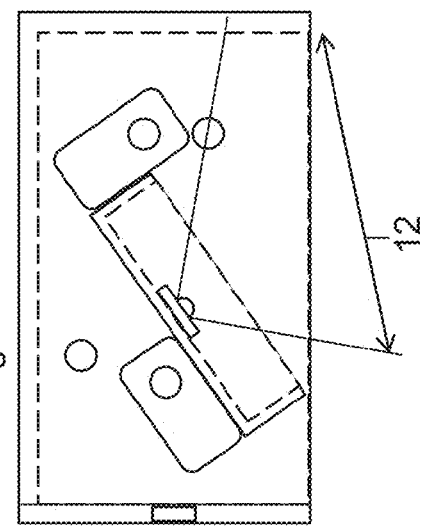

FIG. 25 shows a combination of FIGS. 13 and 20 angled to give an even more shallow vertical light spread, due to it being fitted low to the ground, by keeping a pin located in 4c and moving a pivot pin from 4a1 up to a new location of 4a2, for a vertical angular light spread 12 of 10°.

Figure 26:
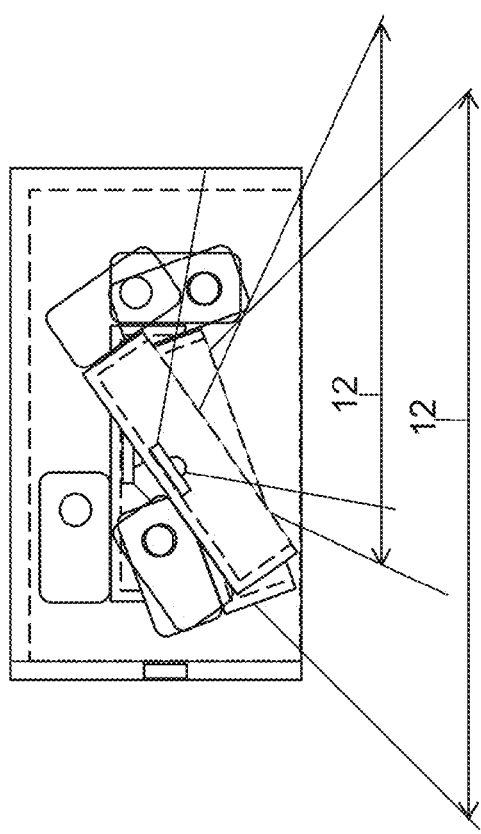

FIG. 26 shows a combination of FIGS. 13 and 20 in three different alternative locations, while staying within the confines of the outer case of a downlight 10, and which in turn remains within the confines of the vehicle/trailer/caravan, offering three different vertical locations and angular dispositions.

FIG. 27 shows a close-up from the rear of a downlight 10 fitted along a side and above a wheel, but within the confines of the semi-trailer 13, with a light spread 12 in a vertical plane.

FIG. 28 shows a close-up of a side of a semi-trailer wheel 8 with a downlight 10 fitted above it, but within the confines of the bodywork and a light spread 11 in a horizontal plane highlighting the wheel position.

Referring to the drawings, a series of downlights 10 are fitted, in a mutually co-operative linear array, to the lower body edge over the entire longitudinal span of the vehicle or trailer, as shown. They are conveniently co-located with side marker lights or reflectors, but are not restricted to that. Locations can include between the wheels 8, for which a more compact light format may be adopted given restricted space around spray shields. FIG. 2 shows the individual down light beam spread or illuminated ground foot print 11 longitudinally with some overlap. FIG. 3 shows the outward lateral downlight beam spread 12, with an abrupt or sharp vertical linear cut-off directly underneath, although some inward spill or intrusion could be admitted. Either or both longitudinal and lateral beam spread can be determined by downlight housing and reflector configuration and by down light mounting direction or orientation. The higher set chassis or body dictates a high downlight mounting position and a wider outward beam spread for a given lamp reflector. FIG. 4 shows a lower set trailer such as a caravan than FIG. 3 with corresponding lower set downlights 10 and concomitant wider outward ground spread 12a. FIGS. 5, 6 and 7 address a particular downlight 10 disposition in relation to vehicle wheels 8. Longitudinal alignment of wheels 8 and downlights 10 is adopted with a marginal edge longitudinal beam spread overlap 11 and outward splay 12.

FIGS. 8, 9 and 10 show lamp body mounting detail, with index and location holes 4a, 4b, 4c and 5.

FIGS. 11, 12 and 13 show another mounting view, with location holes 4a1, 4a2, 4b, 4c and 5.

FIGS. 14, 15 and 16 show further mounting views with location holes 5, 6 and light source 7.

FIGS. 17, 18 and 19 show a downlighter lamp body mounting bracket 2 with location holes 3.

FIGS. 20, 21 and 22 show a bracket for combined side marker light and downlight mounting, with a light source index 7.

FIGS. 23, 24, 25 and 26 show various downlight mounting bracket positions with attendant beam spread 12 from a light source 7, with use of index and location mounting holes to achieve certain pre-set downlight dispositions and orientations.

FIGS. 27 and 28 show downlight 10 disposition at the lower corner edge of a vehicle body 13 adjacent the upper margins of a vehicle wheel, 8 using a compact format downlight body, to achieve a lateral outward beam spread 12 and a longitudinal beam spread 11.

An individual downlight 10 usefully has provision for adjustment of the direction, orientation and horizontal and vertical spread of an output light beam. It is important to limit the upper margins or limit of a beam spread, so as not to shine sideways at too high an angle, and thereby risk distracting or disturbing a bystander or driver of another vehicle. That is an overall beam constraint is imposed. This can be achieved with a mounting and/or with internal reflectors and a cover lens. With a higher light position the beam upper margin is higher for a given beam direction or orientation, so there is likely a need to point the beam more downward to compensate. The lower limit of the beam spread is less critical as the worst case scenario would simply be to direct light wastefully directly under the vehicle; although even there a ground light pool can contribute to overall vehicle prominence, as can any area bathed in light which meets regulations and does not disturb or distract others. For a driver it is the outward spread of a ground pool of light which gives a useful visual reference of position and vehicle planform or footprint width or span and length.

A lamp with an adjustable spread, however effected, is likely to be more expensive to construct, so a minimal adjustment to the lamp body mounting to set an upper beam margin limit would be desirable. Supplementary measures such as movable, segmented or adjustable curvature, reflector panels behind and alongside the light source would offer greater beam spread and directional control, albeit at more expense and time consuming setting.

In an overall vehicle installation a series of down lights are spaced (evenly) along the sides of a vehicle or trailer, generally at positions corresponding to an existing fixed side marker light and reflector. In some variants the side marker and downlighter are co=located, combined, conjoined on a shared mounting or integrated in a common housing. A smaller version is configured to fit over the vehicle wheels where more severe space limitations arise than elsewhere along the vehicle body. A downlight can be fitted closed to or flush with a trailer bottom edge, so as not to increase overall trailer width, and may be inset somewhat under the vehicle body without undue limitation of the laterally outward spread of the pool of light on the ground.

The disposition of mounting holes in a downlight casing or housing, such as preset and mutually aligned in opposite end walls can help with setting an appropriate housing disposition and angular orientation. Thus a pivot mounting hole could serve with one or more companion angular position setting holes on the same side, for ease of reference and setting, and to allow resetting for different fitting heights. Once set, it is desirable to have secure fitting to ensure the downlight orientation and light beam upper margin does not change adversely such as through vehicle vibration.

The housing (horizontal) pivot axis can be at, juxtaposed with or offset from, an internal light source, such as tungsten filament bulb or LED. Similarly, for any internal pivoted or adjustable profile reflector panels and/or outer lens diffuser panels.

The housing can have internal or external baffles, shields or deflectors against unwanted light output. Certain parts of the housing body itself can serve this function or role.

Internal reflectors admit of fixed or movable mounting. Similarly with internal baffles, masks or shutters, including the casing or housing side walls. Reflectors can determine a beam focus or spread, so could have a continuous 3D curvature to that end.

An example overall downlight beam spread viewed from the side would be some 75 degrees, constrained or bounded by the housing or internal reflection body. Of this overall 75 degrees, some 45 degrees could spread forward of a vertical axis through the light source and some 30 degrees rearward of that axis. A removable shutter could further curtail the rearward spread to some 15 degrees. A typical projected light output of some 500 Candelas could be employed. A plan view of beam spread onto the ground could be a rectangular foot print with a housing rear edge boundary at one side, and sharp rectangular cut-off corners or curved corner transitions. A removable reflector shield fitted in a housing body slot could be used to limit or truncate the front or rear beam spread outer margins.

Viewed from the front, a some 90 degree overall beam spread in a vertical plane bounded by inclined opposite housing side walls could provide sufficient longitudinal span to reach or overlap that of a successive adjacent downlight. For a rearward tilted downlight housing or reflector body, to elevate the forward spread and upper angular margin, the light output could be adjusted accordingly, say with a higher output of 700-1200 Candelas for a directly downward pointing housing or reflector, giving a sideways ground spread of 700-1200. This could reduce to 450-700 Candelas for a lamp body or reflector tilted rearward by some 15 degrees with a forward ground spread of 780-1212. For a reflector rearward tilt of some 30 degrees, a further reduced light output of 250-450 candelas could be used, with a forward spread of 933-1680. Installation height affects ground spread, so the provision of housing or reflector tilt can compensate for this as required.

For fanciful decorative or display purposes vehicles have been fitted with diverse light arrays, including lights shining from underneath the body, but these do not address the side delineation role of the present invention.

The preferred embodiments illustrated are not intended to be exhaustive or limit the invention to the precise form disclosed. They are examples to explain the principles of the invention, its application and practical use.

Variants include multiple downlights or light sources fitted side-by-side in a line, within a shared elongate housing, for a more concentrated and delineated light coverage below and adjacent a vehicle, whether truck, bus, recreational vehicle, car or trailer.

A demountable downlight, say fitted upon a quick-release bracket, or an extendible swivel mount, with an umbilical power cord and/or internal rechargeable battery pack might serve as a emergency warning or illumination lamp, with optional switched flashing beacon mode, accessible from the side of a vehicle.

A downlight admits of far wider use than vehicles. Thus, although reflectors and lights on clothing are known a downlight carried by, secured to or integrated with a garment fabric could be deployed to create a personal pool of light, useful for pedestrian visibility and as a supplementary self-illumination security measure. The considerations of beam orientation and spread can be adapted accordingly. Similarly, with beam intensity and power consumption for a portable power source.

The invention claimed is:

1. A multi-role combination lamp comprising:
a housing containing a i) first light beam source and spread portion, and ii) a second light beam source and director portion, wherein,
the first light beam source direction and spread portion includes an internal reflector and external lens configured to direct light output substantially horizontal with a shallow spread angle, of up to 90 degrees in a horizontal plane, to provide a visual side marker and delineator for external observation, and
the second light beam source and director portion includes an internal reflector and external lens configured to direct light output substantially downward with a beam spread angle of 75 degrees in a vertical plane comprising between 15 to 30 degrees rearward of the vertical and limited up to 45 degrees forward of the vertical.

2. The lamp of claim 1, further comprising side marker and down light beam source and director portions located in separate housings, the side marker and down light beam source and director portions being mutually coupled.

3. The lamp of claim 1, further comprising fixed aspect side marker and adjustable down light beam source and director portions sharing a common housing and mounting, the fixed aspect side marker and adjustable down light beam source and director portions being independent in portioning and independently adjustable in beam orientation.

4. The lamp of claim 1, further comprising a plurality of light beam sources and director portions located on respective discrete adjustable mountings to direct beam orientations and beam boundaries with beam spreads determined by reflectors.

5. The lamp of claim 1, further comprising integrated side marker and downlight housings that share a common mounting, the individual side marker and downlight housings retaining independent beam spread and direction for side and downlight beams.

6. The lamp of claim 1, further comprising filters that adjust beam output intensity and colour.

7. The lamp of claim 1, further comprising side marker and down light beam source and director portions in separate housings, and on a shared mounting.

8. The lamp of claim 1, further comprising filters that adjust beam output intensity.

9. The lamp of claim 1, further comprising filters that adjust beam output color.

10. The lamp of claim 1, further comprising diffusers that adjust beam output intensity.

* * * * *